Nov. 6, 1962

P. BRAUN 3,062,468

TAPE THREADING DEVICE

Filed Dec. 30, 1960

INVENTOR.
PAUL BRAUN

BY Amster & Levy

ATTORNEYS

United States Patent Office 3,062,468

Patented Nov. 6, 1962

3,062,468

TAPE THREADING DEVICE

Paul Braun, 269 W. 72nd St., New York 23, N.Y.

Filed Dec. 30, 1960, Ser. No. 79,629
2 Claims. (Cl. 242—74)

The present invention relates generally to threading devices for use with tape recorders, and in particular to an improved tape threader of unitary construction.

In view of the wide acceptance and use of tape recorders in both the home and office, there has been a growing demand for an inexpensive tape threader which would be simple to operate.

Conventional take-up reels for tape recorders are provided with a hub having one or more slots or recesses for receiving the free end of the tape. When the tape is to be threaded on the reel, the end of the tape or the leader provided at the tape end is inserted into one of these slots and the reel is then turned manually on its spindle to wind the end of the tape onto the reel. Experience has shown that a considerable degree of skill and manual dexterity is required to wind the tape on the reel. In the first place, the tape-receiving slot is made narrow so that much time is consumed in threading the end of the tape or leader therein. Furthermore, once the tape end is threaded in this slot it is necessary for the user to try to hold it in the slot with one hand, while turning the reel with the other. The frictional resistance of the tape feeding onto the reel usually causes the tape end to be pulled out of the slot despite all precautions, so that the threading and winding operation must be repeated until the user succeeds in wrapping at least one turn of tape around the reel.

A variety of tape threading expedients have been developed, but these are generally complicated in use and relatively expensive. One such expedient has been a semi-rigid leader to be attached to the end of a tape and having a pre-formed projection thereon sized to be inserted in the threading recess of the tape reel. This requires a pre-formed leader to be attached to each tape used, which requires a large number of leaders to be purchased for a tape library.

It is an object of the present invention to provide a tape threading device in the nature of a simple and inexpensive tool which may be economically manufactured, is easy, convenient and effective in use.

Another object of the invention is the provision of a tape threading device of the character described which may be used in conjunction with most standard tape reels and which is not attached to the reels, so that it is only necessary to obtain a single device for the repeated threading of many reels.

A further object of the invention is the provision of a tape threading device which may be used for quickly and conveniently threading tape on a take-up reel in a simple, one handed operation.

A further object of the invention is the provision of a tape-threading device of the character described which features relatively large areas for receiving advertising, so that the device may be employed as a premium item in the sale of recording tape.

In accordance with the invention herein, the tape-threading device comprises a handle member and a flat tongue depending therefrom. The tongue is made sufficiently thin to be inserted through the tape entry slot of a conventional take-up reel whereby to draw a fold of tape therethrough into the communicating circular opening in the reel. The tongue is also made narrower than the circular opening and shorter than the height of the reel so that it can be manually moved in a circular path to cause the reel to rotate and wrap the tape thereabout while the tongue is holding the fold of tape in the circular opening.

Additional objects and advantages of the invention will become apparent during the course of the following specification when taken in connection with the accompanying drawings, in which.

Figures 1, 2, 3, 4, 5, 6:
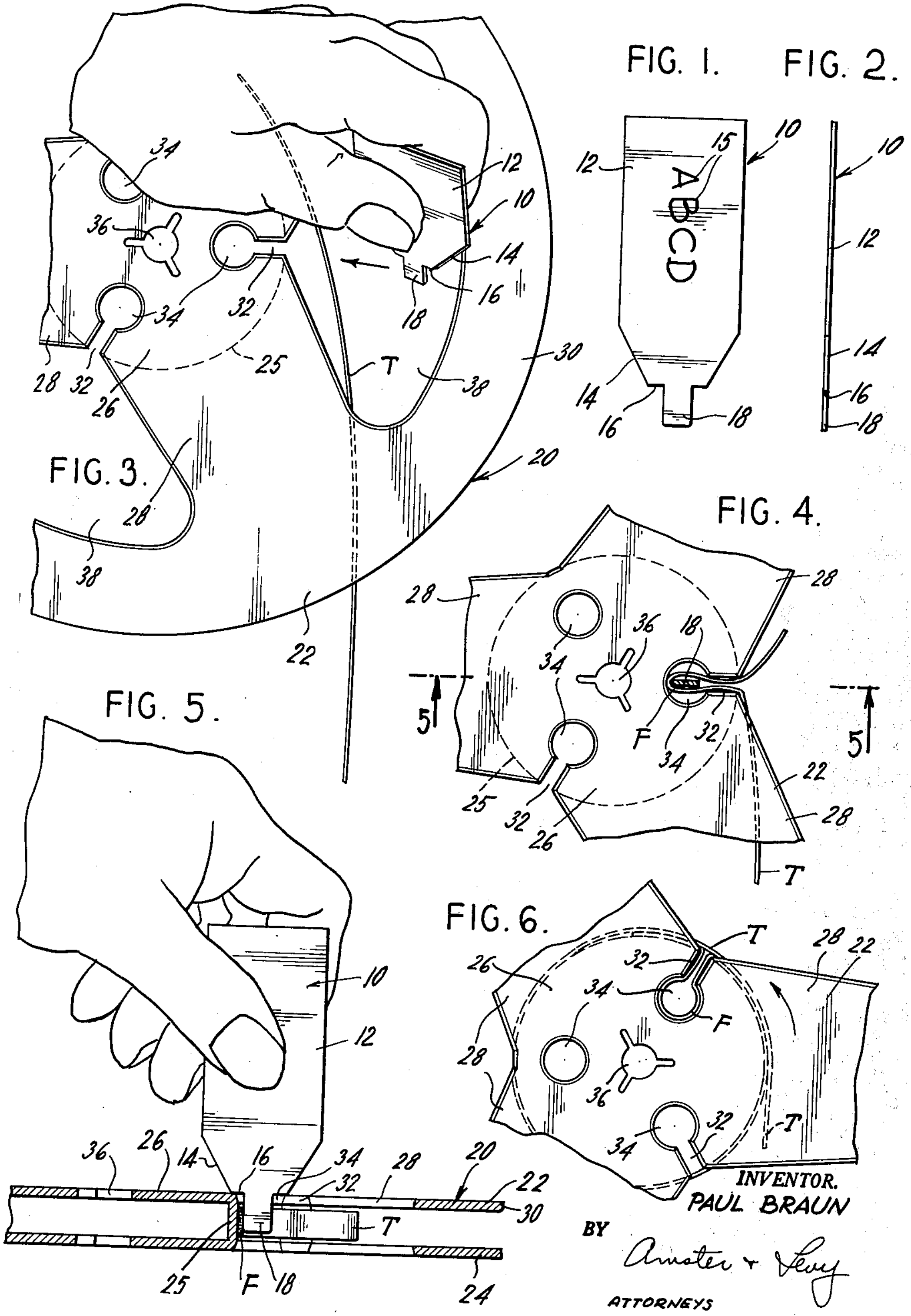
FIG. 1 is a plan view of the improved tape threader showing the flat surface where the advertising matter may be placed.
FIG. 2 is a side elevational view of the improved tape threader.
FIG. 3 is a top plan view of a portion of a conventional tape take-up reel, showing a length of tape to be threaded therein and also showing the improved tape threader held by the user in the position it would assume at the start of the threading operation.
FIG. 4 is a fragmentary top plan view of the tape take-up reel showing the tape inserted by the tool in one of the reel slots prior to winding the tape on the reel.
FIG. 5 is a sectional view taken along line 5—5 of FIG. 4 and showing the tool held in the user's hand.
FIG. 6 is a fragmentary top plan view of the tape take-up reel similar to FIG. 4, but showing the tape after it is wound on the reel and the tool removed.

Referring now specifically to the drawings, and particularly to FIGS. 1 and 2, the numeral 10 designates a tape threading device made in accordance with the invention. In its broad aspects, the device 10 comprises a handle or gripping portion 12 and a tongue 18 of smaller size.

The handle 12 may be made of any suitable size and shape such that it may be gripped by one hand of the user. In its preferred commercial form, the handle 12 is made in the form of a flat rectangular plate, as illustrated in the drawings herein, and the tongue 18 is made as an integral terminal extension thereof. The device 10 may be thus economically manufactured as a one-piece unit, of stamped metallic sheet material, plastic, fiberboard, or other suitable, fairly rigid material. In this preferred form, the flat handle 12 presents opposed flat surfaces for receiving advertising material or the like, indicated at 15 in FIG. 1.

In its preferred form, one end of the handle 12 has convergently tapering edges which extend to a transverse shoulder 16 from which tongue 18 extends. The purpose of the tapered edges 14 and shoulder 16 in the use of the threading device 10 will be presently explained.

The tape threading device 10 is intended for use with a standard take-up reel illustrated herein and designated generally by the reference numeral 20. The reel 20 is conventional and well-known, but a familiarity with its structure is essential to an understanding of the present invention.

The tape take-up reel 20 is formed of a pair of circular plates 22 and 24 connected in spaced relation at their central portions by a circular wall 25 to define a hub portion 26. Both plates 22 and 24 comprise an annular outer rim 30 and a plurality of spaced radial spokes 28 which connect the outer rim 30 with the hub portion 26. In conventional reels presently on the market, each plate 22 and 24 is formed of a single sheet of rigid plastic material, with the hub portion 26, rim 30 and spokes 28 integral with each other. The plates 22 and 24 are parallel to each other and are spaced by a distance slightly in excess of the width of the tape to be wound on the reel 20, as shown in FIG. 5. The spokes 28 of the respective plates 22, 24 are in transverse registry with each other, leaving a number of open areas 38 between the rim 30, the spokes 28 and the hub portion 26.

The hub portion 26 has a plurality of spaced circular openings 34 therein, which openings 34 are spaced inwardly from the circular wall 25. In conventional reels, a circular opening 34 is provided for each of the open areas 38 and is in alignment with the center of its corresponding open area 38. At least one of the circular openings 34 communicates with a tape entry slot 32 extending through the circular wall 25 and opening into the corresponding open area 38. In tape take-up reels presently on the market, the number of circular openings 34 provided with tape entry slots 32 varies according to the manufacturer. In the reel 20 illustrated herein, by way of example, two of the three openings 34 are shown having slots 32. The hub portion 26 also has a central spindle-receiving aperture 36 sized to permit the reel to be mounted upon the usual tape recorder spindle (not shown).

In order to use the tape threading device 10, the empty tape take-up reel 20 is mounted on a tape recorder with the spindle receiving aperture 36 over the spindle of the tape recorder. The free end of the tape or the tape leader T is then inserted between the spaced plates 22, 24 of the tape take-up reel 20, so that the tape T extends along a portion of the hub 26 in the vicinity of one of the tape entry slots 32. The user then grasps the handle 12 of the tape threading device 10 and holds the latter in a vertical position with the tongue 18 extending downwardly, as is best seen in FIG. 3. While holding the tape threading device 10 in this position, the user inserts it into one of the open areas 38 communicating with a slot 32, between the rim 30 and the tape or tape leader T. The tape threading device 10 is then moved inwardly toward the hub 26 of the take-up reel 20 until the side edge of tongue 18 comes into contact with the tape T. At this time the user merely has to position the tape threading device 10 so that the plane of tongue 18 is parallel to the axis of slot 32 and continue the inward movement of the tape threading device until the tongue 18 passes sideways through the tape entry slot 32 and enters the communicating circular opening 34. In such movement, the tongue 18 forms a fold F in the end portion of the tape or tape leader T and carries said fold F into said circular opening 34, as shown in FIG. 4. It will be appreciated that the tongue 18 is made of appreciably lesser thickness than the width of tape entry slot 32, so that said tongue can pass freely through slot 32 carrying the tape fold F.

Due to the structure of the tape threading device 10, and in particular the convergent tapering edge portions 14 thereof, the tape threading device is forced upwardly in the circular opening 34 until the shoulder 16 comes to rest on the upper surface of the hub portion 26, as is clearly seen in FIG. 5, leaving only the tongue 18 and the fold F of tape T remaining in the circular opening 34 of the reel 20. That is to say, when the device 10 is moved inwardly toward hub portion 26, the adjacent tapered edge 14 engages the edge of the circular opening 34 opposite the slot 32 and is cammed upwardly until the shoulder 16 overlies said edge of opening 34.

It will be observed that the length of tongue 18 is less than the height of the circular opening 34, so that when the tongue 18 is located in said opening 34, as shown in FIG. 5, the bottom end of the tongue 18 does not project beyond the lower surface of the reel 20. This permits the tape threading device 10 to be used to crank the reel 20 for winding the tape thereon, without rubbing against or binding on the top surface of the tape recording machine. It will be observed in FIG. 4, that the width of the tongue 18 is appreciably less than the diameter of the circular opening 34. This permits the circular opening to turn freely about the tongue 18 during the cranking or winding operation which will now be described.

When the tongue 18 and the tape fold F carried thereby are located in the circular opening 34 of reel 20, as shown in FIG. 4, it is merely necessary for the user to move the tape threading device 10 in a direction parallel to the circumference of the reel 20, thus causing reel 20 to rotate about the tape recorder spindle in the direction in which the tape is to be wound thereon during operation of the tape recorder. Normally, this direction of rotation will be counterclockwise. As the threading device 10 is moved in a circular path, the circular opening 34 revolves about the tongue 18 contained therein, and tape is drawn from the opposite reel and wrapped about the wall 25 forming hub portion 26. The reel 20 is turned in this manner until it has completed at least one full revolution and at least one turn N of tape is wound thereon, as shown in FIG. 6. The rotation of the circular opening 34 about the blade 18 causes the tape fold F carried by blade 18 to assume the circular shape shown in FIG. 6 and hug the wall of the circular opening 34. The turn N of tape crosses the mouth of the corresponding slot 32, and by frictional engagement with hub portion 26, holds the end of the tape in threaded condition so that it will not pull out of circular opening 34 when the tape recorder is operated. The tape is now securely threaded on take-up reel 20, and the tape threading device 10 is removed so that the tape recorder can be operated.

While a preferred embodiment of the invention has been shown and described herein, it is obvious that numerous additions, changes and omissions may be made in such embodiment without departing from the spirit and scope of the invention.

What I claim is:

1. The combination with a tape take-up reel having a hub portion, at least one tape-receiving circular opening in said hub portion, and a tape entry slot communicating with said circular opening; a tape-threading device comprising a handle, a flat tongue projecting from one end of said handle, said tongue being of lesser thickness than the width of said tape entry slot so that said tongue in an upright position may slide sideways through said slot from the exterior of said hub portion drawing a fold of tape into said circular opening, said tongue being of lesser width than the diameter of said circular opening so that the tongue and said tape-threading device may be inserted through said entry slot and into said opening with the tape engaging the side walls of said circular opening and moved manually in a circular path parallel to the circumference of said reel to cause said reel to rotate, to wind tape about said reel, said handle having an inclined surface extending upwardly and outwardly above said tongue engageable with the upper edge of said opening, the length of said tongue also being smaller than the height of said circular opening whereby the bottom edge of said tongue is spaced above the bottom surface of said reel as said walls of the circular opening turn about said tongue.

2. The combination with a tape take-up reel having a hub portion, at least one tape-receiving circular opening in said hub portion, and a tape entry slot communicating with said circular opening; a tape-threading device comprising a flat handle having opposed planer surfaces, a flat tongue projecting from one end of said handle, said tongue being of lesser thickness than the width of said tape entry slot so that said tongue may slide through said slot from the exterior of said hub portion drawing a fold of tape into said circular opening, said tongue being of lesser width than the diameter of said circular opening so that said tape-threading device may be moved manually in a circular path parallel to the circumference of said reel to cause said reel to rotate and the walls of the circular opening to turn about said tongue so that tape is wound about said reel, said handle having a transverse shoulder at its junction with said tongue and an inclined surface leading to said shoulder, said inclined surface engaging the edge of the circular opening opposite said tape entry slot as the tongue is moved into said circular opening and providing a camming action for lifting said tape-threading device relative to said reel to a position in which said shoulder overlies the upper surface of said reel adjacent said circular opening for resting thereupon as said tape-threading device is moved in said circular path and the walls of said opening are turned about said tongue, the distance between said shoulder and the free end of said tongue being less than the height of said circular opening.

References Cited in the file of this patent

UNITED STATES PATENTS

| | | |
|---|---|---|
| 1,314,012 | Mowers | Aug. 26, 1919 |
| 1,408,425 | Passavanti | Feb. 28, 1922 |
| 1,429,692 | Passavanti | Sept. 19, 1922 |
| 1,797,390 | Wood | Mar. 24, 1931 |

FOREIGN PATENTS

| | | |
|---|---|---|
| 26,706 | Great Britain | of 1896 |
| 766 | Great Britain | of 1914 |
| 503,960 | Great Britain | Apr. 18, 1939 |